(12) United States Patent
Malihy (10) Patent No.: US 11,416,895 B2
(45) Date of Patent: Aug. 16, 2022

(54) LOCATION-BASED ADVERTISING SYSTEM FOR AN AUTOMOBILE

(71) Applicant: Carduna Inc, Studio City, CA (US)

(72) Inventor: Shefer Malihy, Rosh Haayin (IL)

(73) Assignee: Carduna Inc., Studio City, CA (US)

( * ) Notice: Subject to any disclaimer, the term of this patent is extended or adjusted under 35 U.S.C. 154(b) by 0 days.

(21) Appl. No.: 16/847,218

(22) Filed: Apr. 13, 2020

(65) Prior Publication Data
US 2021/0319477 A1 Oct. 14, 2021

(51) Int. Cl.
*G06Q 30/02* (2012.01)
*H04W 4/029* (2018.01)
*H04W 4/021* (2018.01)
*G09F 21/04* (2006.01)

(52) U.S. Cl.
CPC ..... *G06Q 30/0266* (2013.01); *G06Q 30/0264* (2013.01); *G09F 21/048* (2013.01); *H04W 4/021* (2013.01); *H04W 4/029* (2018.02)

(58) Field of Classification Search
CPC .. G06Q 30/0266; G06Q 30/0265; G08G 1/20; G09F 21/048; G09F 21/045
See application file for complete search history.

(56) References Cited

U.S. PATENT DOCUMENTS

| | | | | |
|---|---|---|---|---|
| 10,416,947 B2 * | 9/2019 | Zenoff | ................ | G09G 3/2014 |
| 2019/0251600 A1 * | 8/2019 | Cabrera | ................ | H04W 4/021 |

OTHER PUBLICATIONS

"Firefly," https://web.archive.org/web/20200301015107/https://fireflyon.com/, Mar. 1, 2020.

* cited by examiner

*Primary Examiner* — Azam A Ansari
(74) *Attorney, Agent, or Firm* — The Roy Gross Law Firm, LLC; Roy Gross (57) ABSTRACT

A system has a display device attached to an automobile, with a display screen visible outside the automobile. Workstations specify location-based rules regarding image content to be displayed in specified geographic areas at specific times, and further specify a predetermined threshold of a number of automobiles that display a given threshold-limited image. An application server determines from the location-based rules a dynamic content schedule of image content to display at the display device when the automobile is in the given geographic region at a given display time. When the predetermined threshold of the number of automobiles displaying the threshold-limited image in the given geographic region is reached, an update to the dynamic content schedule is generated including a different image in place of the threshold-limited image, and a current image corresponding to the updated dynamic content schedule is displayed.

8 Claims, 11 Drawing Sheets

LOCATION-BASED ADVERTISING SYSTEM FOR AN AUTOMOBILE

BACKGROUND

1. Field

This disclosure generally relates to the field of computing systems. More particularly, the disclosure relates to location-based computing systems.

2. General Background

Conventional advertising configurations allow for entities (e.g., companies, people, etc.) to promote various products and services; yet such configurations are typically directed toward performing advertising through statically-positioned advertising apparatuses. For example, a billboard is a conventional statically-positioned advertising apparatus that remains stationary while people pass by it.

Not only are conventional advertising configurations typically statically-positioned, but also typically configured to have a static display of content. For example, the billboard will typically have signage displayed thereon, or adhered thereto, which is continuously displayed until it is replaced, after a certain time period, with new signage.

Yet, the foregoing static positioning and static display of content do not effectively measure metrics for advertisers. In particular, advertisers have no reliable means for determining whether or not an advertising apparatus, such as a billboard, is delivering a message to the intended audience.

SUMMARY

A location-based advertising system has a display device that is attached to a portion of an automobile. The display device renders a plurality of advertisements according to a dynamic advertisement schedule. Furthermore, the display device has a flexible display screen that adjusts to a shape of the portion of the automobile. The location-based advertising system also has a location-based sensor that is positioned at the automobile, and the location-based sensor determines a geographical position of the automobile along an advertising trip performed by the automobile. Also, the location-based advertising system has a controller that is positioned at the automobile such that the controller is in operable communication with the location-based sensor. The controller activates the rendering of each of the plurality of advertisements based upon a corresponding advertising location being reached by the automobile along the advertising trip. Additionally, the location-based advertising system has a controller encasing that encases the controller and the location-based sensor. The controller encasing is positioned at the automobile. Finally, the location-based advertising system has an application server that hosts a software application, which is executed by a driver operating the automobile to render, at a computing device positioned within the automobile, a graphical user interface corresponding to the dynamic advertisement schedule.

Alternatively, a computer program may have a computer readable storage device with a computer readable program stored thereon that implements the functionality of the aforementioned system. As yet another alternative, a process that utilizes a specialized processor may implement the functionality of the aforementioned system.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A location-based advertising system for an automobile is configured to allow an advertiser to remotely, and dynamically, update one or more electronically displayed advertisements based upon a location of the automobile. In particular, the location-based advertising system is configured to update an electronically displayed advertisement via a display device that is adhered to the automobile. In one embodiment, the display device is adhered to an inner portion of the automobile such that the display device is visible to viewers outside of the automobile. For example, the display device (e.g., display screen, television, computer monitor, etc.) may be adhered (e.g., glued, clipped, pinned, bolted, screwed, magnetized, suctioned, etc.) to the interior portion of a window, such as the rear window of an automobile, and/or the perimeter thereof. For instance, the display device may be a transparent light emitting diode ("LED") display screen that allows for a display to be viewed from the exterior of the automobile, but allows for at least partial transparency so that the driver of the automobile may view outside of the automobile through the display device as if the rear window is fully, or partially, clear. (The example of an LED display screen is provided only as an example. Other types of display devices (e.g., projectors) may be used instead.) In another embodiment, the display device may be adhered to an exterior portion of the automobile. For example, the display device may be attached to the hood of the automobile. To protect the display device from inclement weather, it may be encased within, or encoated with, a weather-proofed material. In any of the foregoing configurations, the display device may be contoured, or at least substantially contoured, to the shape of the particular portion of the automobile to which the display device is to be adhered. As an example, a rear windshield may taper inward at one or more angles, and the display device may be fitted to substantially match the shape of the rear windshield (e.g., a tapering angle that is within a range of zero to forty degrees of the tapering angle of the rear windshield). Accordingly, the contouring and/or partial one-sided transparency allow for seamless positioning of the display device on the automobile. To accommodate the foregoing contouring, the display device may be fabricated from a flexible material, thereby allowing the display device to function as a retractable (e.g., roll-up) display device that conveniently adjusts to different shapes of different portions of the same automobile, or the same portion of different automobiles.

In essence, the location-based advertising system allows an advertiser to selectively determine, from a remote location, when and where advertisements will be displayed. For instance, the advertiser may select a particular geographical radius within which an advertisement should be displayed on the automobile. By using various analytics, based upon previous statistical data, the location-based tracking system, and/or the advertiser's system, may automatically determine one or more optimal geographic locations, as well as optimal times of day for that geographic location (e.g., daytime as opposed to nighttime), to display an advertisement to exceed a probability threshold of reaching an intended audience. (Alternatively, an advertiser may manually select the location and time of day for an advertisement via the system, such as through a software application or web portal.) For example, an advertisement for a restaurant that is open for breakfast and lunch may be advertised between the hours of five a.m. and two p.m., but not in the evening when it does not provide service. In other words, the location (e.g., five mile radius) in which the advertisement is advertised by the moving automobile may provide for optimal advertising at certain times of the day rather than others. In contrast with conventional automotive advertising configurations, which were directed to advertisements fixed for a location and time, the location-based advertising system is able to dynamically update advertisements based upon location and time, giving advertisers automated control of advertisement propagation. In essence, advertisers are able to provide pinpointed selection of the time and place for display of their advertisements.

Additionally, drivers are able to easily configure the remote and dynamic display of advertisements via a software application on a mobile computing device (e.g., smartphone, tablet device, smartwatch, etc.) of the user that is positioned within the automobile. Without the need for professional installation or conspicuous, heavy equipment to vertically stand the display device on the roof of the automobile, the location-based advertising system allows a user to seamlessly and conveniently position the display device on his or her automobile. Furthermore, the driver may generate revenue (fiat currency, cryptocurrency, rewards, tokens, etc.) for himself or herself from the advertiser for driving the automobile with the advertisement on n advertising trip through the designated location at the designated time.

As a result, the location-based advertising system allows both advertisers and drivers to benefit. The efficacy of advertising systems is significantly enhanced via real-time (measured as a humanly imperceptible time delay), or sub- stantially real-time (measured as a humanly perceptible, but acceptable time delay (e.g., one to ten seconds)), dynamic advertising updates performed by the display device from the time that the display device enters or exits a particular geographic region at a particular time designated by the advertising system. Furthermore, the user experience for the driver is significantly enhanced as the user may determine a flexible schedule for himself or herself at which to generate income for advertisements. In one embodiment, the driver may determine a particular route to travel based on the amount of potential revenue from various advertisers, as indicated by the GUI of the mobile computing device of the user. For example, an advertiser may be more willing to pay the driver more for travel through a heavily populated area than a less populated area.

Figure 1A:
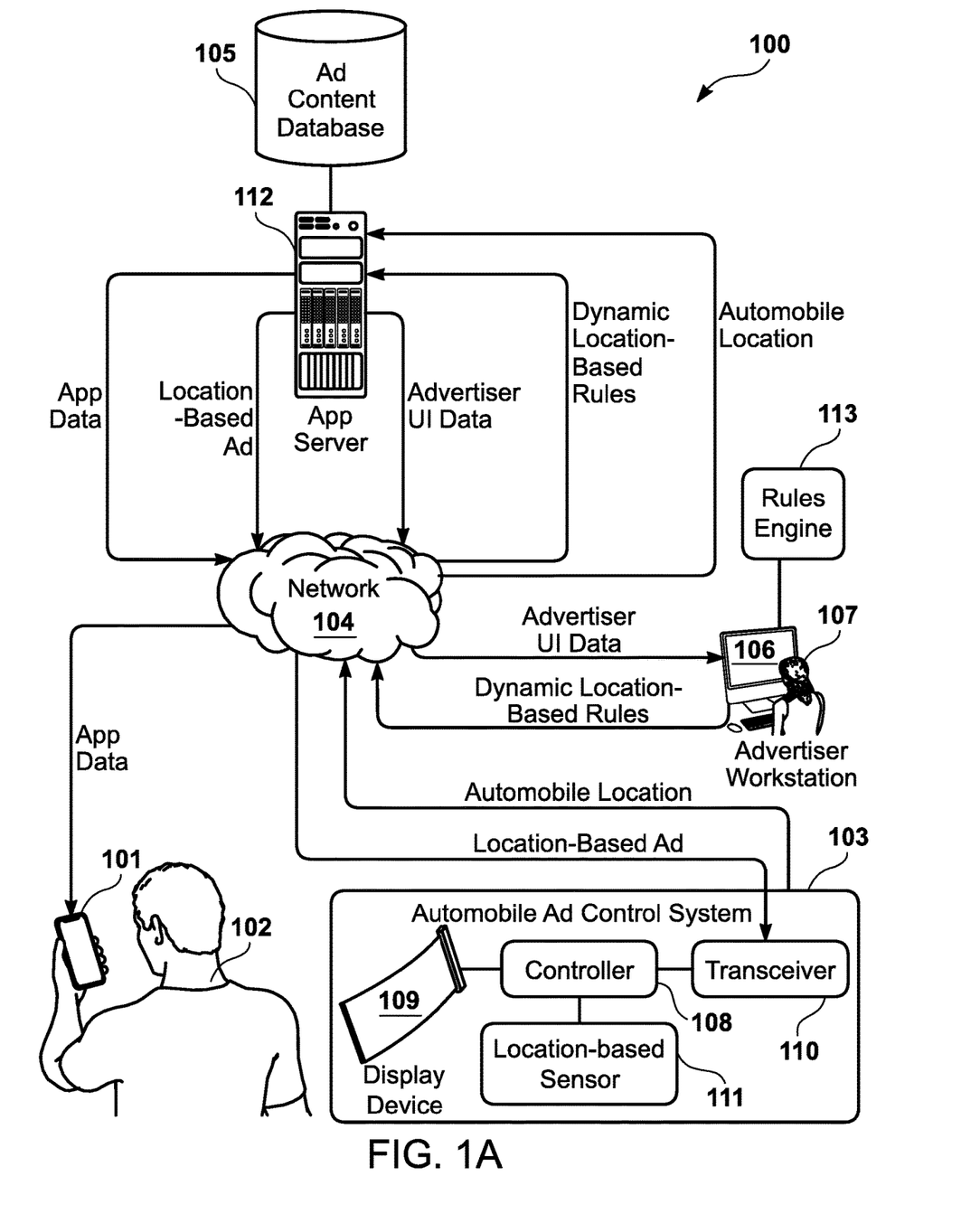
FIG. 1A illustrates an automobile-centric configuration of the location-based advertising system.
Figure 1B:
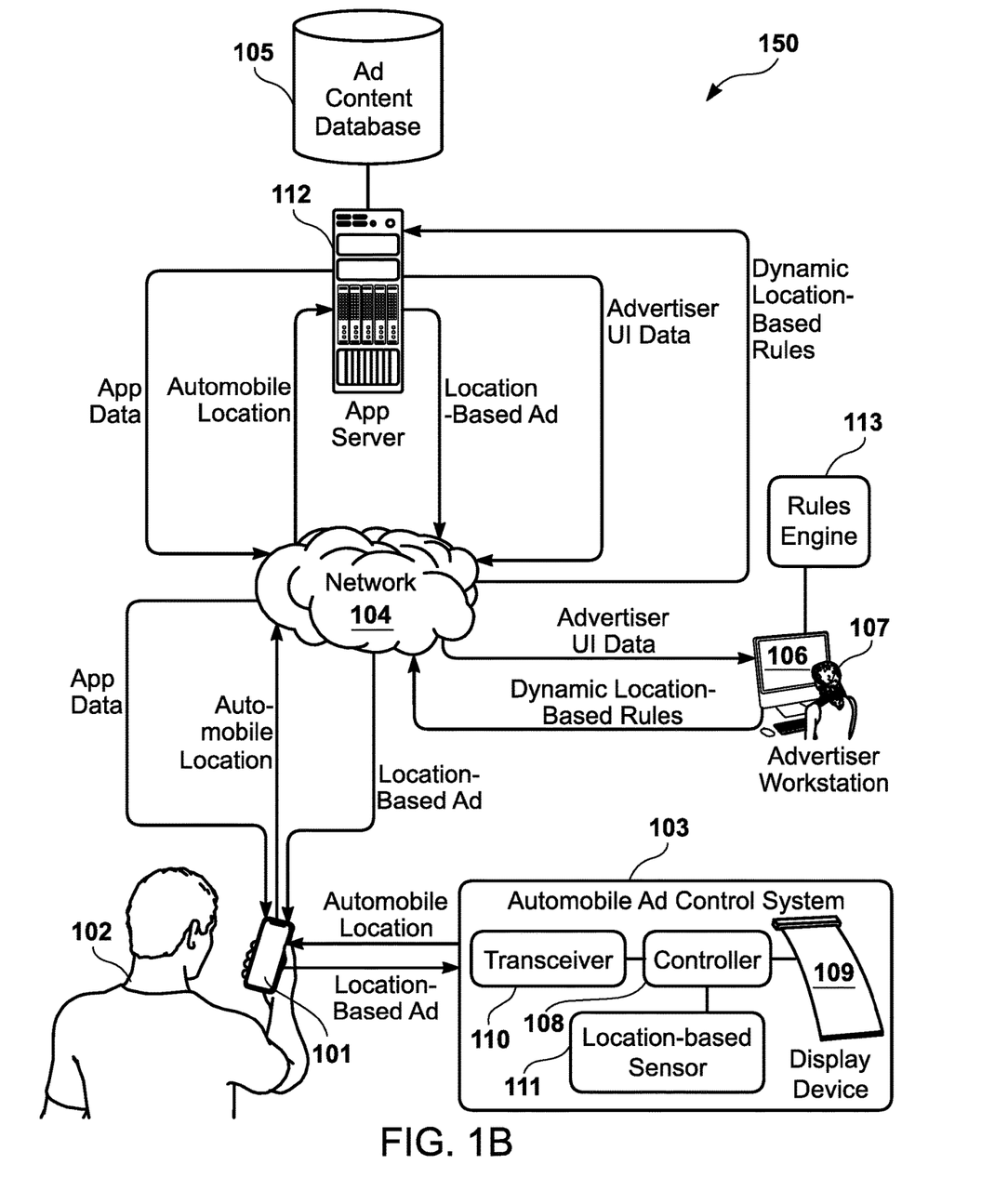
FIG. 1B illustrates a mobile device-centric configuration of the location-based advertising system.

FIGS. 1A and 1B illustrate examples of various configurations of a location-based advertising system. In particular, FIG. 1A illustrates an automobile-centric configuration 100 of the location-based advertising system. The automobile-centric configuration 100 has an automobile advertising control system 103 that is operably attached to an automobile (i.e., internally, externally, or both internally and externally). The driver 102 of the automobile may easily attach, or detach, the automobile advertising control system 103 from the automobile via various connection mechanisms (e.g. bolts, pins, screws, suction cups, magnets, etc.), allowing for convenient installation by many drivers, which provides more incentive to advertisers.

To perform operations for location-based advertising, the automobile advertising control system 103 utilizes a controller 108. In particular, the controller 108 may be a specialized processor that is in operable communication with a display device 109, a transceiver 110, and a location-based sensor 111 (e.g., GPS). The controller 108 and the foregoing componentry each may be separately encased modules that communicate with each other via wired (e.g., cables) or wireless (e.g., BLUETOOTH, etc.) connectivity. Alternatively, some of the componentry may be positioned within a single encasing (e.g., one encasing, which may be in operable communication with the display device 109, and may encapsulate the controller 108, the transceiver 110, and the location-based sensor 111). As yet another alternative, all of the componentry may be integrated within the display device 109. By placing the location-based sensor 111 within the same encasing as the controller 108, the location-based advertising system prevents potential fraudulent activity performed by the driver 102 (i.e., the driver 102 travelling with his or her smartphone with the location-based sensor 111 away from the display device 109 adhered to the automobile while being logged into a software application as actively travelling). Accordingly, the location-based sensor 111 may be tied to the positioning of the controller 108. In an alternative embodiment, the location-based sensor 111 may be positioned within the mobile computing device 101. In yet another alternative, two location-based sensors 111 may be utilized: one in the automobile control system 103 and one in the mobile computing device 109. As a security validation, the application server 112 may receive the locations from both sensors to ensure that the mobile computing device 109 and the automobile control system 103 are in the same place (i.e., the automobile).

Upon detecting the location of the automobile in which it is positioned, the controller 108 may then transmit, in real-time or substantially real-time, the automobile location data via a network 104 to an application server 112. Using the automobile location data, the application server 112 is able to determine an optimal advertisement from an advertisement content database 105, which the application server 112 is in operable communication with. Additionally, the application server 112 may receive one or more timestamps from the controller 108 to obtain an accurate recording of the time that the automobile entered or exited a particular geographic region. (Alternatively, the timestamps may be generated by the application server 112 at the time that the application server 112 receives the location data.) Accordingly, the timestamps also may be utilized to determine an optimal advertisement. In one embodiment, an advertiser workstation 106, which may be automatically operated by a specialized processor (e.g., via an artificial intelligence ("AI") system) or manually operated by an advertiser representative 107), may generate one or more dynamic location-based rules, such as via a rules engine 113, and may transmit those dynamic location-based rules to the application server 112. The dynamic location-based rules may be predetermined, prior to the application server 112 receiving the location data from the controller 108, to allow the application server 112 to quickly determine the optimal location-based, and potentially time-based, advertisement, and send that optimal location-based advertisement to the transceiver 110 of the automobile advertisement control system 103. The controller 108 may then render a display of that advertisement on the display device 109 in real-time, or substantially real-time, from the time that the location data was sent to the application server 112. Alternatively, the advertiser workstation 106 may generate the dynamic location-based rules on-the-fly upon a request received from the application server 112 after the application server 112 receives the location of the automobile. For example, the advertiser workstation 106 may want to be aware of the number of automobiles currently displaying a particular advertisement prior to instructing the application server 112 to request the automobile advertisement control system 103 display that advertisement. If a predetermined threshold of automobiles is already displaying that advertisement within the designated geographic location at the designated time, the advertiser workstation 106 may select a different advertisement for display, or may request that the application server 112 contact a different advertiser. As yet another alternative, the application server 112 may generate the dynamic location-based rules on behalf of the advertiser. For example, the advertiser may provide particular requirements (e.g., budget, intended audience, etc.), and the application server 112 may determine optimal dynamic location-based rules based on those requirements. For instance, the advertiser may require maximization of advertisement dissemination to an intended audience, and the application server 112 may determine an optimal location based on a statistical analysis of demographics in various geographic locations. In any of the foregoing embodiments, the dynamic location-based rules may include a variety of rules such as, but not limited to, location, time, quantity of current advertisements in a geographic location at a current time, and advertising budget.

Although only one advertiser workstation 106 is illustrated in FIG. 1A as an example, many advertiser workstations 106 from the same or different advertisers may be utilized as part of the location-based advertising system. For example, multiple advertisers may be bid for placement in a particular geographic region and for a particular time slot, via a GUI generated by the application server 112.

Furthermore, the location-based advertising system may have a software application that is executed by a mobile computing device 101 that is operated by the driver 102. For example, the driver 102 may position the mobile computing device 101 within a mobile computing device accessory that adheres to an inner portion of the automobile (e.g., dashboard mount, suction cup, etc.). The driver 102 may then interact with the mobile computing device 101 before, during, or after the trip. In essence, the software application allows the driver 102 to initiate, pause, or end advertisement display and revenue generation, but with the application server 112 acting as a proxy between it and the automobile advertiser control system 103. In other words, the controller 108 and the mobile computing device 101 may each communicate, independently of the other, with the application server 112, which hosts the software application.

Although one server (e.g., application server 112) is illustrated as being utilized by the location-based advertising system, multiple servers may be utilized instead. For example, one application server 112 may be utilized to communicate with the mobile computing device 101, and another application server 112 may be utilized to communicate with the advertiser workstation 106. The servers may then communicate with each other.

Alternatively, FIG. 1B illustrates a mobile device-centric configuration 150 of the location-based advertising system. Instead of having each of the mobile computing device 101 and the automobile advertising control system 103 communicate with the application server 112, as illustrated in FIGS. 1A and 1B, the mobile device-centric configuration 150 utilizes the mobile computing device 101 to communicate all of the data associated with the automobile to the application server 112. For instance, the automobile advertising control system 103 may transmit the automobile location, based upon the output from the location-based sensor 111, to the mobile computing device 101 so that the mobile computing device 101 may transmit the automobile location data to the application server 112. The automobile advertising control system 103 may communicate directly with the mobile computing device 101 via a wired (e.g., USB cable) or wireless (e.g., BLUETOOTH) connection. Notably, the variation illustrated in FIG. 1B is only one particular variation to the automobile-centric configuration 100 of the location-based advertising system illustrated in FIG. 1A. For instance, as yet another alternative, the automobile advertising control system 103 may be the centralized point of communication for all data communicating back and forth with the application server 112—the mobile computing device 101 may transmit and receive any data, from the application server 112, through the automobile advertising control system 103.

Figure 2A:
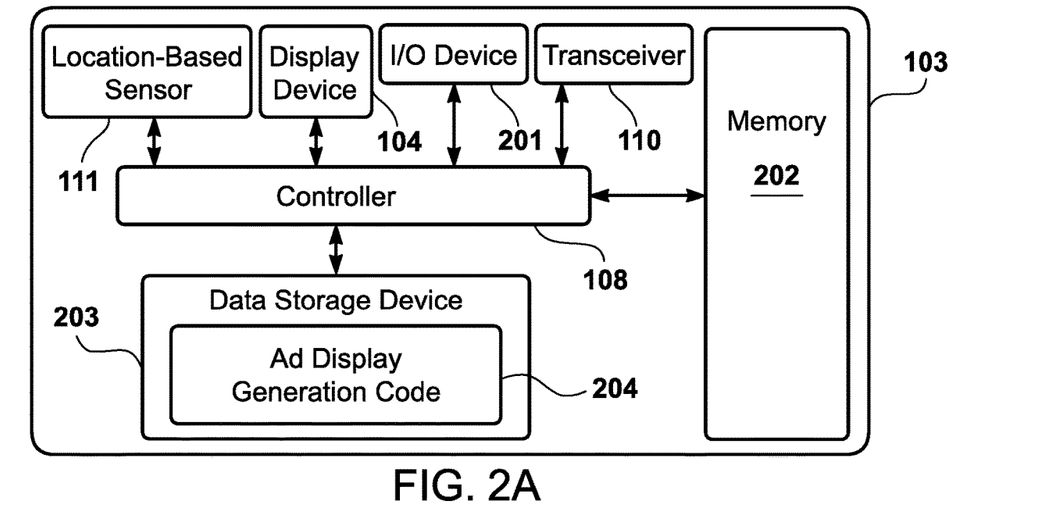
FIG. 2A illustrates a system configuration for the automobile advertising control system.
Figure 2B:
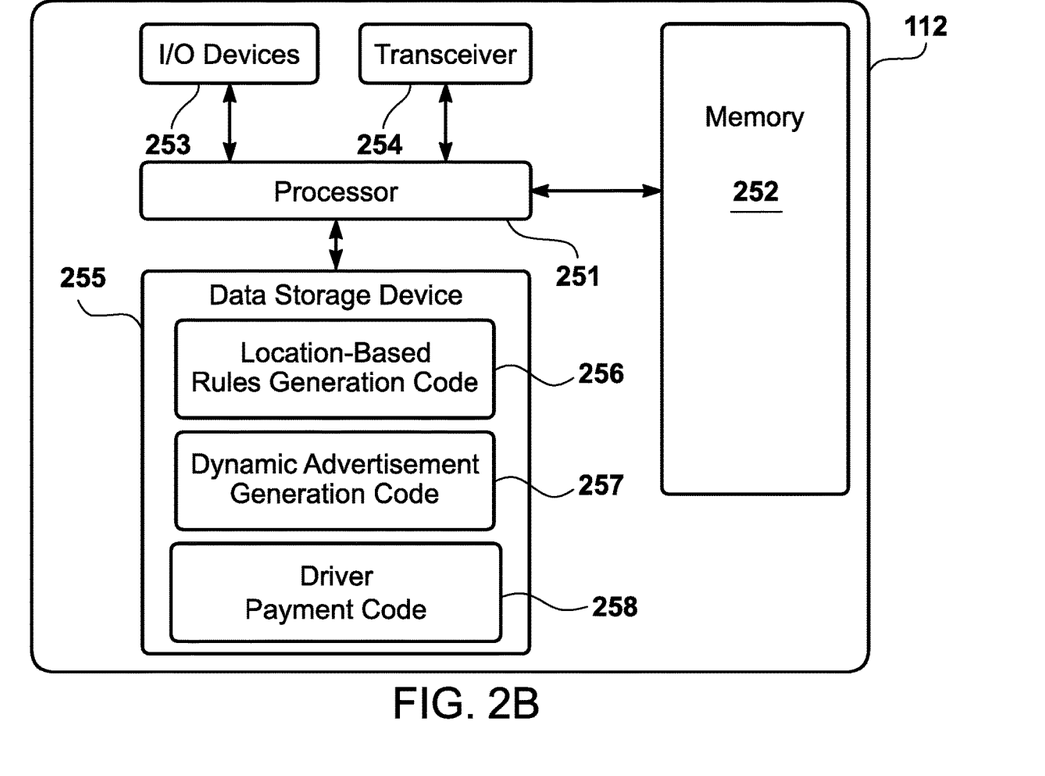
FIG. 2B illustrates a system configuration for the application server.
Figure 2C:
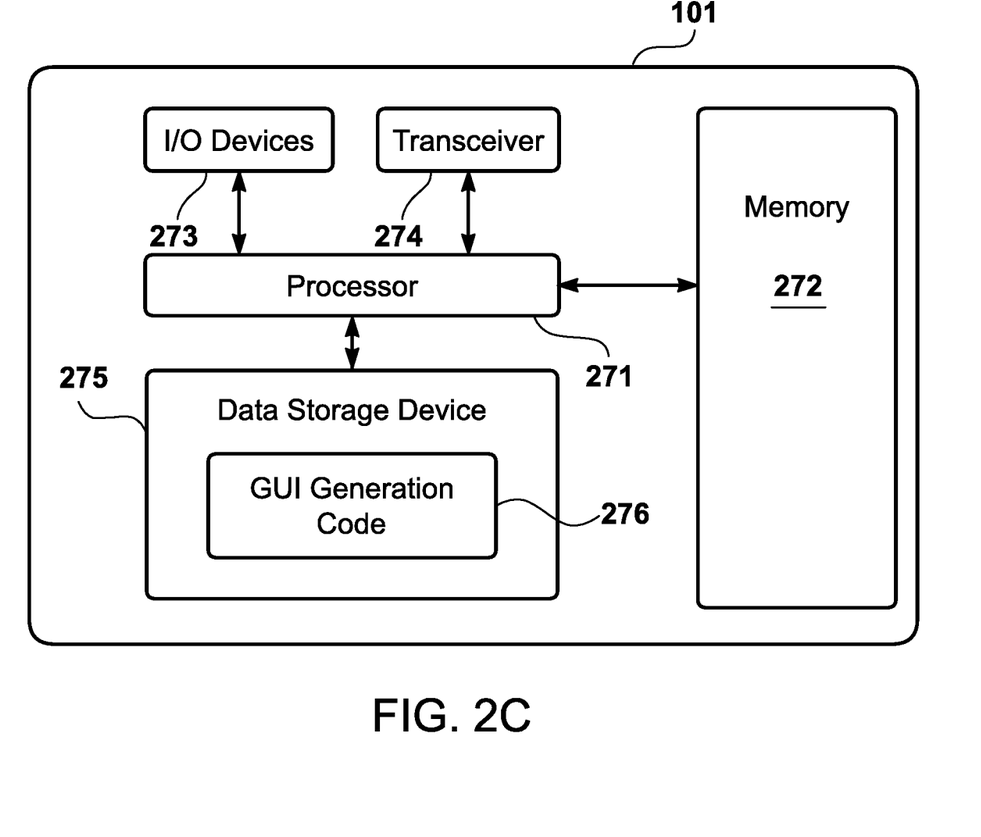
FIG. 2C illustrates a system configuration for the mobile computing device.

FIGS. 2A-2C illustrate system configurations for the various componentry of the location-based advertising systems illustrated in FIGS. 1A and 1B. In particular, FIG. 2A illustrates a system configuration for the automobile advertising control system 103. The automobile advertising control system 103 may have the controller 108, illustrated in FIGS. 1A and 1B, which may be specialized for tasks such as advertisement display generation and dynamic advertisement updates.

The system configuration may also include a memory device 202, which may temporarily store advertisements based upon a dynamic advertisement schedule indicated by the one or more predetermined location-based advertising rules, as determined by the application server 112 and/or the advertiser workstation 106. For example, the dynamic advertisement schedule may indicate that, upon entry of the automobile into a particular geographic radius, the controller 108 should activate each of a plurality of advertisements along the route within the geographic radius. In particular, the dynamic advertisement schedule may indicate a time period for display of each advertisement, by the display device 109. For example, the dynamic advertisement schedule may indicate that the first advertisement should be displayed for thirty seconds, the second advertisement should be displayed for twenty seconds thereafter, etc. By storing the dynamic advertisement schedule, as well as advertisements, or portions thereof, that are next in the queue, the memory device 202 allows for the controller 108 to perform fast enough retrieval and rendering of advertisement data for real-time, or substantially real-time, rendering upon entry of the automobile into the geographic radius. In other words, upon entry within the geographic radius, or other predefined geo-fence (e.g., city, town, county, state, or other form of geographic boundary), the controller 108 initiates rendering of the sequence of advertisements according to the dynamic advertisement schedule without a perceptible delay to the driver 102 or viewers outside of the automobile that view the advertisements. In one embodiment, the dynamic advertisement schedule is generated from a single advertiser with one or more advertisements intended for viewing along an advertising trip driven by the driver 102. In another embodiment, the dynamic advertisement schedule is generated from multiple advertisers, each having at least one advertisement scheduled in the queue for dynamic advertising by the automobile advertising control system 103. As a result of the foregoing efficiency, the advertiser workstation 106 is assured that the advertisements on the dynamic advertisement schedule are fully displayed during the allocated time within the allocated geographic region, without time delays that could reduce the size of the intended audience for the advertisements.

Furthermore, the memory device 202 may store computer readable instructions performed by the controller 108. As an example of such computer readable instructions, a data storage device 203 within the system configuration may store advertisement display generation code 204. The controller 108 may execute the advertisement display generation code 204 to generate the display of advertisements upon the automobile entering a particular geographic region at a particular time, as dictated by the one or more predetermined location-based advertising rules, such as through the dynamic advertisement schedule. In essence, the dynamic advertisement schedule indicates what, and when, dynamic advertising updates should be performed by the controller 108 for rendering on the display device 109 that is adhered to the automobile.

To determine positioning of the automobile, the controller 108 may be in operable communication with the location-based sensor (e.g., GPS). Furthermore, the controller 108 may render the advertisements, potentially in sequence, on the display device 109 (e.g., roll up LED display device, flexible non-roll up LED display device, etc.).

Moreover, the system configuration may have one or more input/output ("I/O") devices 201 that may receive inputs and provide outputs. Various devices (e.g., keyboard, microphone, mouse, pointing device, hand controller, joystick, etc.) may be used for the I/O devices 201. The system configuration may also have a transceiver 110 to send and receive data. Alternatively, a separate transmitter and receiver may be used instead.

By way of contrast, FIG. 2B illustrates a system configuration for the application server 112. In particular, the application server 112 may have a processor 251, which may be specialized for tasks such as generating location-based, and potentially time-based, rules dictating the rendering of advertisements on the display device 109 adhered to the automobile driven by the driver 102, as well as tasks such as generating the advertisements themselves.

The system configuration may also include a memory device 202, which may temporarily store the one or more predetermined location-based advertising rules in a data structure (e.g., one-dimensional array, two-dimensional array, linked list, etc.) for improved processing times by the application server 112. For example, the one or more predetermined location-based advertising rules may indicate a predetermined threshold, which should not be exceeded, of automobiles displaying advertisements in a particular geographical region, If an additional automobile is proximate to that geographical location, the application server 112 may utilize the processor 251 to perform a dynamic update, in real-time or substantially real-time, measured from the time that the predetermined threshold is exceeded to the time that the dynamic advertisement schedule is received by the mobile computing device 101, to the dynamic advertisement schedule to render different advertisements for the advertiser that imposed that particular rule, or potentially render advertisements for a different advertiser.

The memory device 252 may store computer readable instructions performed by the processor 251. As an example of such computer readable instructions, a data storage device 255 within the system configuration may store location-based rules generation code 256, dynamic advertisement generation code 257, and driver payment code 258. The processor 251 may execute the location-based rules generation engine code 256 to invoke the rules engine 113, which may be in operable communication with the application server 112 instead of the advertiser workstation 106, to automatically generate the one or more location-based advertisement rules. Alternatively, the rules engine 113 may generate one or more recommendations to an advertiser to provide one or more inputs, such as at the advertiser workstation 106, for the one or more location-based advertisement rules. Additionally, the processor 251 may execute the dynamic advertisement generation code 257 to dynamically generate an advertisement. Moreover, the processor 251 may execute the driver payment code 258 to process payments for the driver 102 based upon the advertising trip.

Also, the system configuration may have one or more I/O devices 253 that may receive inputs and provide outputs. Various devices (e.g., keyboard, microphone, mouse, pointing device, hand controller, joystick, etc.) may be used for the I/O devices 253. The system configuration may also have a transceiver 254 to send and receive data. Alternatively, a separate transmitter and receiver may be used instead.

Although FIG. 2B is discussed with respect to a system configuration for the application server 112, it may be used in part, or in the alternative, for the advertiser workstation 106. For example, the advertiser workstation 106 may utilize the location-based rules generation engine code to invoke the rules engine 113 to automatically generate the one or more predetermined location-based advertisement rules, and then send the one or more predetermined location-based advertisement rules to the application server 112.

Furthermore, FIG. 2C illustrates a system configuration for the mobile computing device 101. In particular, the mobile computing device 101 may have a processor 271, which may be specialized for tasks such as generating a GUI that is rendered by the mobile computing device 101. The GUI may allow the driver 102 to interact with the software application that communicates with the application server 112 to provide a user experience to the driver 102 before, during, and/or after the advertising trip. For example, the GUI allows the driver 102 to initiate an advertising trip, view the dynamic location-based advertisement schedule, view the advertisement that is currently being displayed on the display device (given that the driver 102 is unable to view the exterior of the automobile while inside it), and view the current balance earned for the current trip and/or previous trips.

The system configuration may also include a memory device 272, which may temporarily store computer readable instructions performed by the processor 271. As an example of such computer readable instructions, a data storage device 275 within the system configuration may store GUI generation engine code 276. The processor 271 may execute the GUI generation code to render the GUI, corresponding to the software application, on a display screen of the mobile computing device 101. Moreover, the system configuration may have one or more I/O devices 273 that may receive inputs and provide outputs. Various devices (e.g., display screen, touch screen, keyboard, microphone, camera, mouse, pointing device, hand controller, joystick, etc.) may be used for the I/O devices 273. The system configuration may also have a transceiver 274 to send and receive data. Alternatively, a separate transmitter and receiver may be used instead.

Figure 3A:
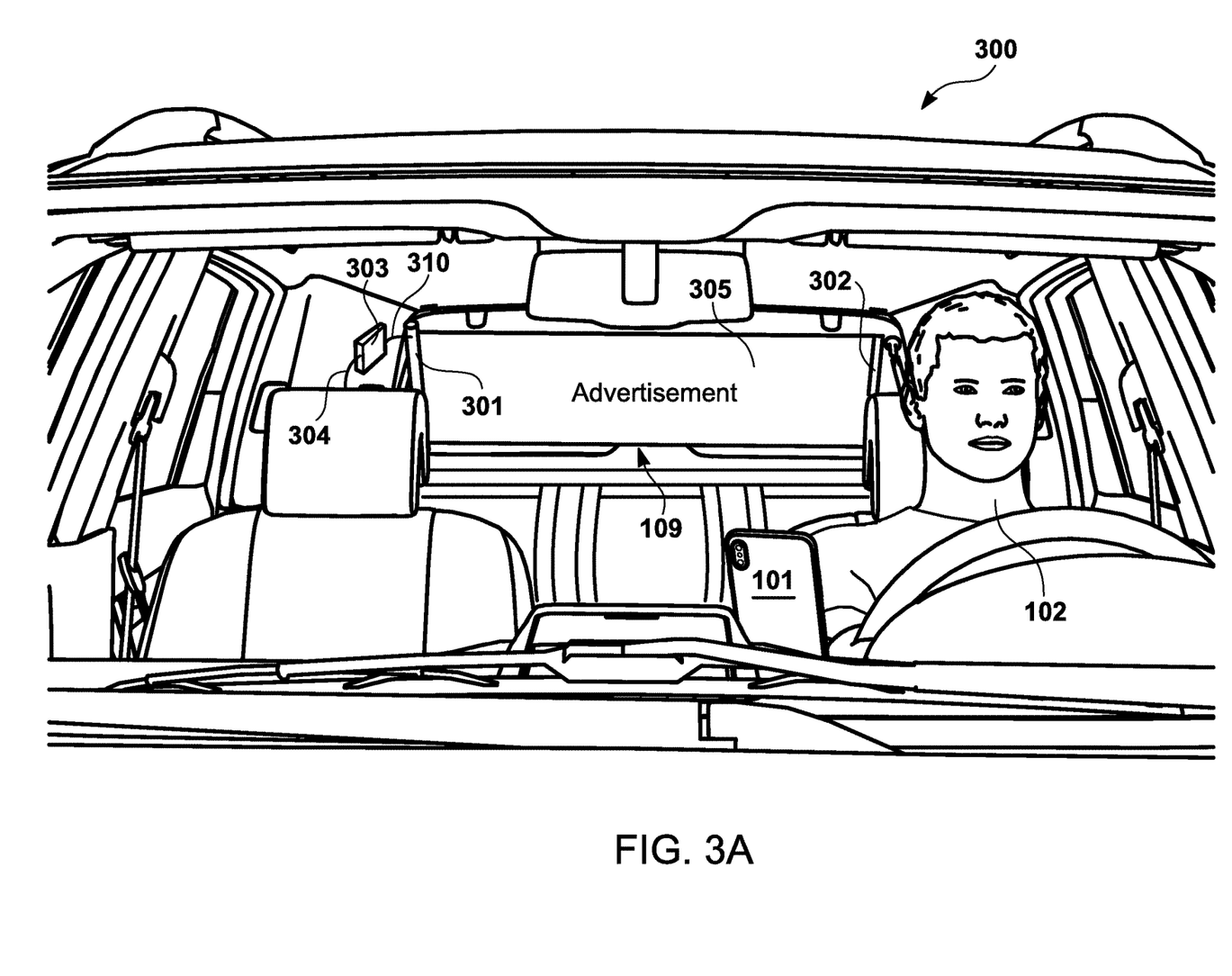
FIG. 3A illustrates a front perspective view of the automobile with the driver positioned therein.

Irrespective of how the advertisement is generated via the various configurations described herein, ultimately, it is rendered at the display device 109 adhered to an automobile 300, as illustrated in FIGS. 3A-3E. In particular, the display device 109 may be adjusted to adhere to different portions of the automobile 300. Various types of connectors (e.g., magnets, suction cups, clips, etc.) allow the driver 102 to easily install the display device 109. FIG. 3A illustrates a front perspective view of the automobile with the driver 102 positioned therein. In this particular configuration, the display device 109 is adhered to the interior portion of the rear windshield of the automobile 300 to display the advertisement for viewing from the exterior of the automobile 300. A controller encasing 303, which may encompass the controller 108, may be operably connected (e.g., via a cable 310) to, or in operable wireless communication with (e.g., via BLUETOOTH), the display device 109. As illustrated the controller encasing 303 may be adhered (e.g., hook-and-loop fastener, magnets, suction cups, etc.) to an interior portion of the automobile 300, such as a rear interior panel. (The rear interior panel is illustrated only as an example, given that other interior portions of the automobile 300 (e.g., ceiling, floor, door, headrest, chair, etc.) may be utilized instead.) Additionally, in one embodiment, the controller encasing 303 may be connected via a cable 304 to a power source (e.g., USB port, lighter, etc.) located in proximity to the driving console of the automobile 300. As illustrated, the cable 304 may be positioned to be connected in a downward direction (e.g., underneath car seats, along car seat panels, etc.) to reach the driving console. In another embodiment, the cable 304 may be positioned to be connected in an upward direction (e.g., along the ceiling, or corners and edges of the ceiling, to reach the driving console). In yet another embodiment, the controller encasing 303 may be powered via an internal power source, or a removable power source (e.g., a rechargeable battery). The controller encasing 303 may also include other componentry (e.g., location-based sensor 111, transceiver 110, etc.).

The driver 102 may interact with the mobile computing device 101 prior to, during, or after the advertising trip to communicate with the application server 112, illustrated in FIGS. 1A and 1B. In particular, the driver 102 may interact with a GUI rendered by the mobile computing device 101.

The advertisement displayed by the display device 109 may be selected from a variety of different content (e.g., videos, still imagery, etc.). In addition, in one embodiment, the advertisement may be interactive. For example, if the automobile 300 is stationary, an animated avatar may be displayed by the display device 109 to interact with pedestrians and/or other drivers. The animated avatar, which may be operated by an AI system, may provide questions and answers to viewers. For instance, one or more image capture devices may be in operable communication with the controller 108 within the controller encasing 303, or adhered to the automobile 300 external to the controller 108, to capture imagery of viewers. In response to detecting the presence of a viewer positioned in proximity to the to the display device 109 for a time period that exceeds a predetermined threshold, indicating an interested viewer that is somewhat stationary, the controller 108 may emit audio form one or more speakers in operable communication with the controller 108 within the controller encasing 303, or adhered to the automobile 300 external to the controller 108. Furthermore, one or more microphones may capture audio emitted by the viewers. In response to any questions regarding the advertisement, the controller 108 may utilize the AI, which may be accessible locally and/or through the application server 112, to determine appropriate responses, such as product or service information. In essence, the dynamic automobile advertising system may provide interactive advertisements. In one embodiment, the virtual avatar may provide such interaction via the same display device 109 in which the advertisement is provided (e.g., through a virtual window that takes up a portion the rendered display of the advertisement). Alternatively, an additional display device may be adhered to the automobile 300 to allow for interactions with the avatar concurrently with the display device 109 proceeding onward with respect to other advertisements in the dynamic advertisement schedule.

Figure 3B:
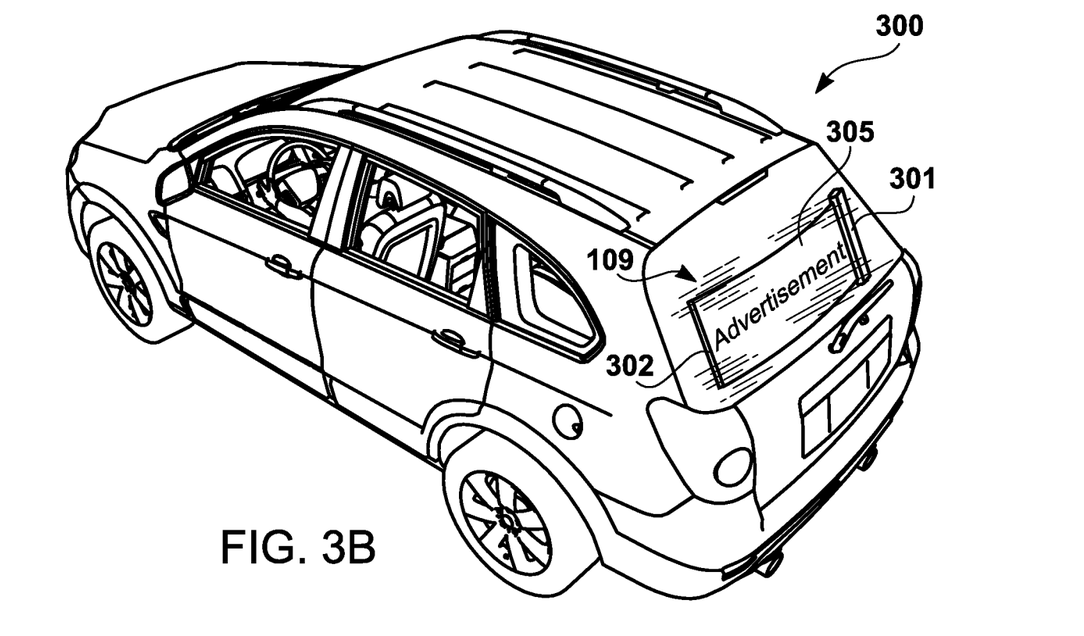
FIG. 3B illustrates a rear perspective view of the automobile illustrated in FIG. 3A.

FIG. 3B illustrates a rear perspective view of the automobile 300 illustrated in FIG. 3A. As depicted, the display device 109 may be fabricated from a flexible material to be conveniently adhered to the shape of the rear window from the interior of the automobile, but viewed from the exterior. In one embodiment, the display device 109 has one-sided, partial or full, transparency when viewed from the interior of the automobile 300 and one-sided, partial or full, opaqueness when viewed from the exterior of the automobile 300. In other words, the driver 102 can see clearly through the rear window of the automobile 300, without seeing the advertisement through the rear window, while a person positioned outside of the vehicle (e.g., a pedestrian, a driver of another vehicle, etc.) may view the advertisement.

In one embodiment, the display device has a display screen 305 that is pulled from a display device enclosure apparatus 301 via a pulling apparatus 310. In another embodiment, the display screen 305 may be rolled up around the exterior of an apparatus (e.g., cylindrically-shaped) to which it is adhered to.

Figure 3C:
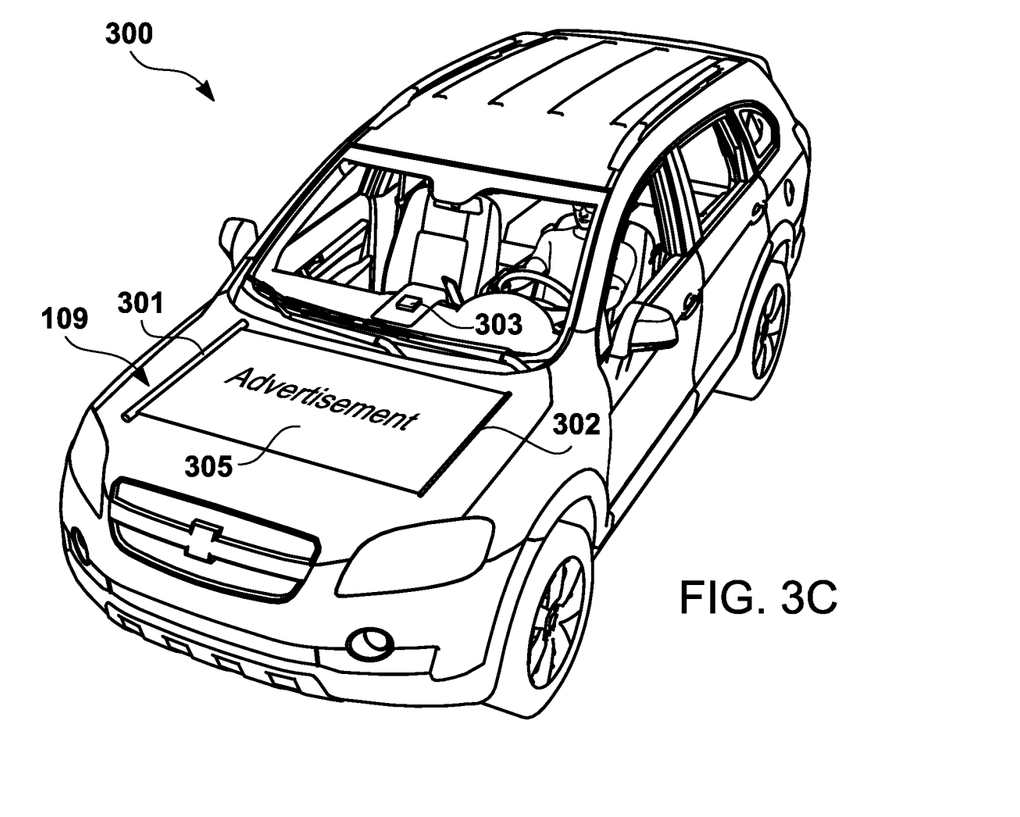
FIG. 3C illustrates an example of a front perspective view of the automobile in which the display device is positioned on the hood of the automobile.

The positioning of the display device 109 on the rear window of the automobile 300 is just one example of where the display device 109 may be positioned with respect to the automobile 300. As another example, FIG. 3C illustrates a front perspective view of the automobile 300 in which the display device 109 is positioned on the hood of the automobile 300. Given the external placement of the display device 109, the controller 108 may be positioned within the controller encasing 303 within the automobile 300, and may wirelessly communicate with the display device 109. Alternatively, the controller encasing 303 may be positioned on the hood, as a separate encasing from the display device 109. As yet another alternative, the componentry of the controller encasing 303 may be integrated within the display device 109 to allow for convenient positioning of one device on the hood, or other external portions, of the automobile 300. Furthermore, to prevent theft of the display device 109 and/or the controller encasing 303, connectors may allow for easy detachment by the driver 102 upon completion of the advertising trip by the driver 102. For example, the driver 102 may remove display device 109 and/or the controller encasing 303 from a magnetic connection that secures them to the hood of the automobile 300, The driver 102 may then store the display device 109, which may be retractable (e.g., a roll-up display device), in the interior of the automobile 300 or in another convenient storage location.

Figure 3D:
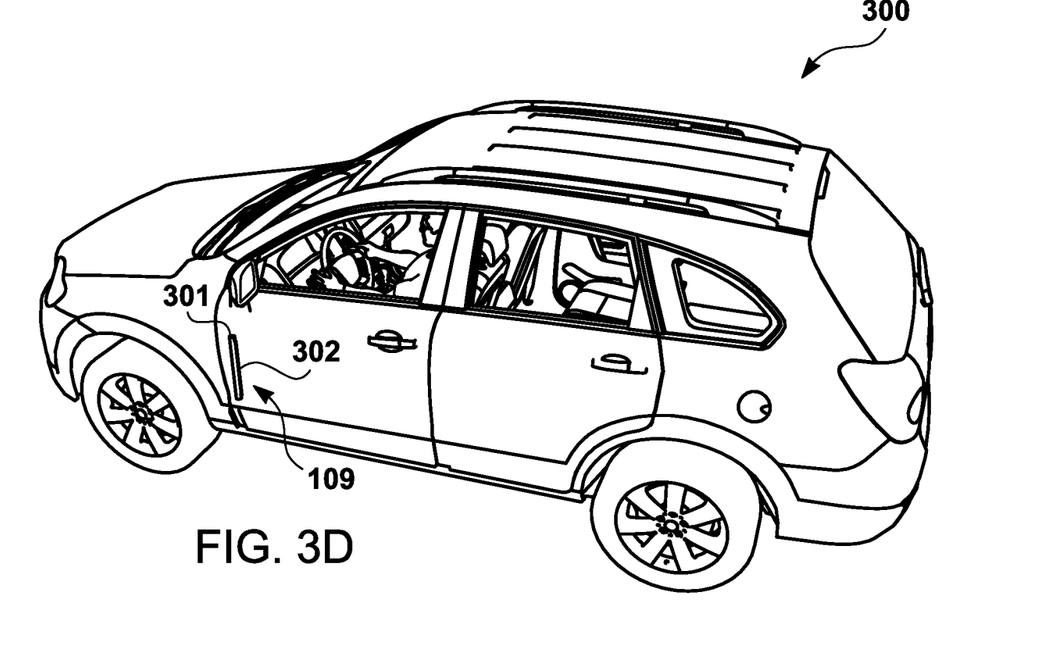
FIG. 3D illustrates a side perspective view of the automobile, whereby the display device is adhered, in a retracted mode, to an external portion of a door.
Figure 3E:
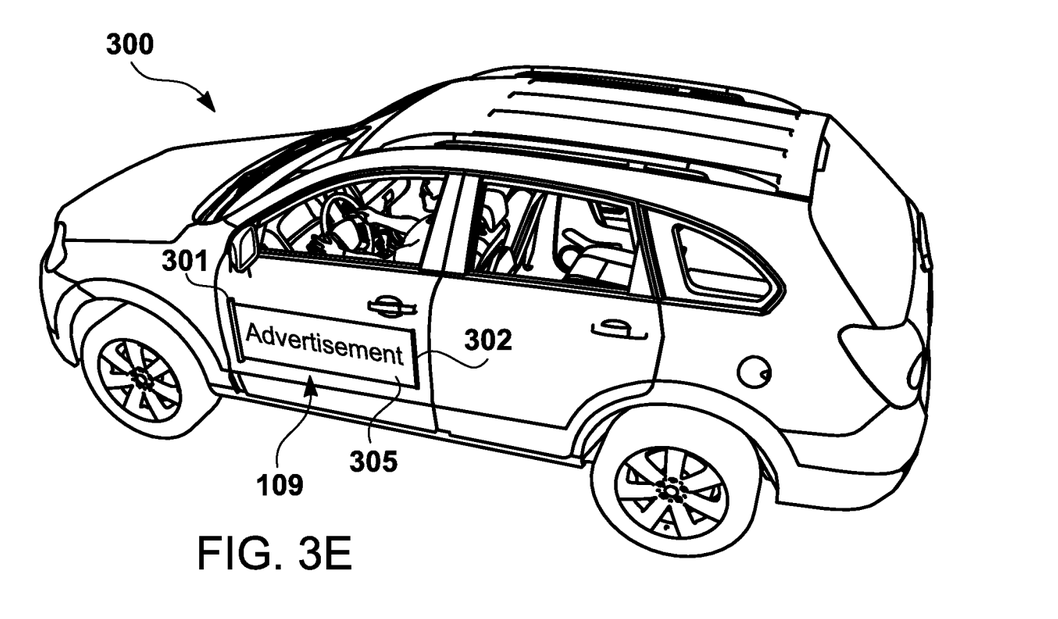
FIG. 3E illustrates the display device of FIG. 3D being positioned in un-retracted form.

FIG. 3D illustrates a side perspective view of the automobile 300, whereby the display device 109 is adhered to an external portion of a door in a retracted mode. For example, the display device 109 may have a display device enclosure apparatus 330 in which the display device 109 may be retracted. In one embodiment, the controller 108, and/or other componentry of the automobile advertising control system 103, may be integrated therein. In another embodiment, the controller 108 may be positioned inside of the automobile 300 and communicate wirelessly with the external display device 109. FIG. 3E illustrates the display device 109 being positioned in un-retracted form the display device enclosure apparatus 330.

Although the display device 109 is described as being flexible, in another embodiment, it may be encased within a rigid material that is not flexible. For example, the display device 109 may be a television. Furthermore, the display device 109 may be adhered to an exterior portion of the automobile 300, such as the roof. Various connectors (e.g., brackets) may be utilized to connect the display device 109 vertically, or substantially vertically, to the roof of the automobile 300.

Figure 4:
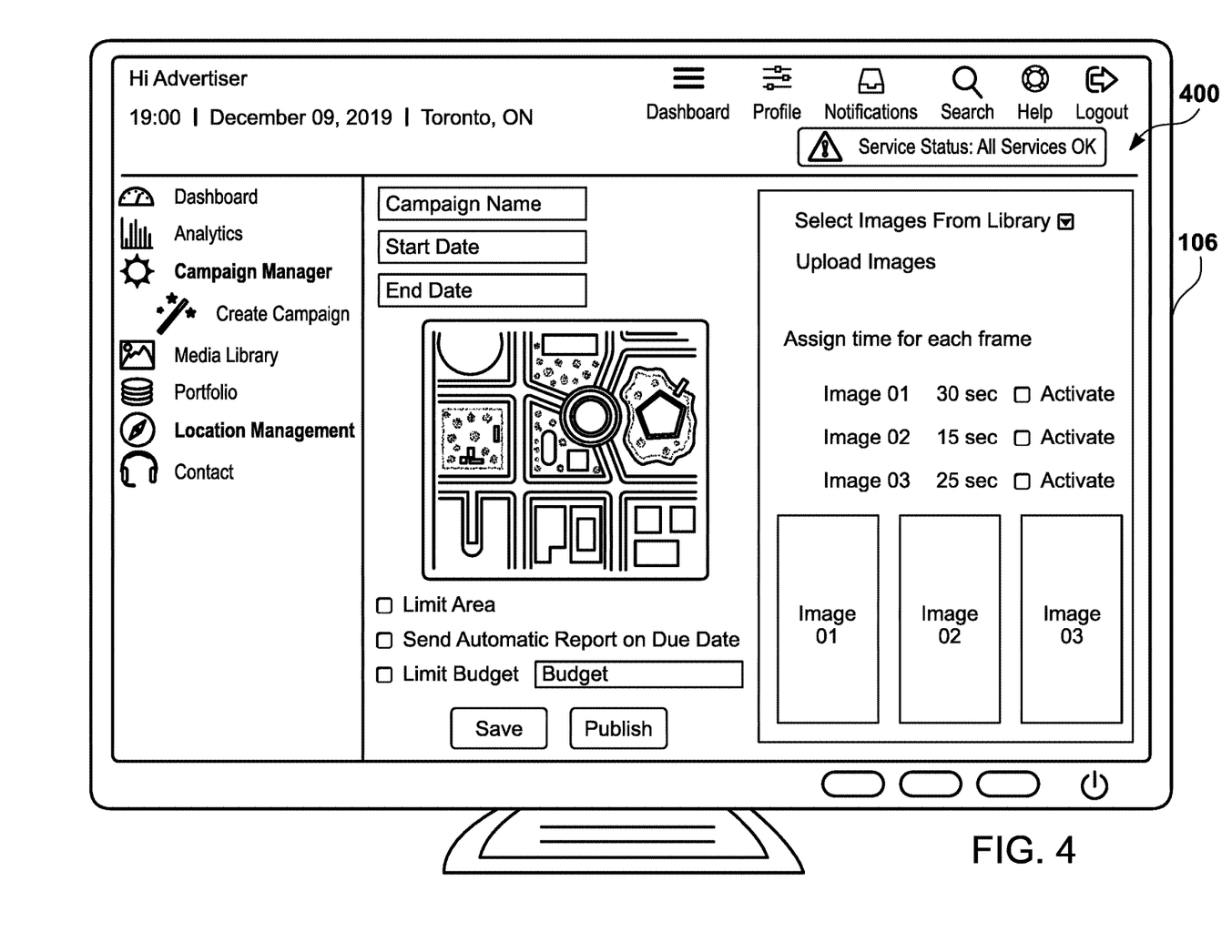
FIG. 4 illustrates an example of a graphical user interface ("GUI") that may be displayed by the advertiser workstation.

With respect to what advertisement is displayed on the display device 109, which may be adhered to various internal or external portions of the automobile 300, the advertiser workstation 106 may be utilized by an advertiser to generate an advertising campaign. In particular, FIG. 4 illustrates an example of a GUI 400 that may be displayed by the advertiser workstation 106. The GUI 400 may be a dashboard that allows the advertiser representative 107 to perform a variety functions. Firstly, the advertiser representative 107 may generate a new advertising campaign. A particular geographic location may be selected, such as through a virtual map corresponding to the geographic location. Various other data, such as campaign name, start date, and end date also may be inputted into the GUI 400 for the campaign. Furthermore, the advertiser may select a budget for the advertising campaign.

Most notably, the GUI 400 allows the advertiser to select not only the geographic location for an advertisement to be displayed by the display device 109 adhered to the automobile 300, but also the image advertisement content for the campaign. For instance, the various images may be selected for the dynamic advertisement schedule. Additionally, the time duration for each advertisement may be selected as well. For example, an advertiser may want to allocate a portion of its budget for thirty seconds for one advertisement, and five seconds for another. In essence, the GUI 400 allows the advertiser to generate a dynamic advertising schedule of advertisements that are automatically displayed in the intended sequence upon the automobile 300 entering the geographic region (e.g., radius) selected by the advertiser, optionally at a designated time also selected by the advertiser.

Furthermore, the GUI 400 may also display various analytics that may be generated by the application server 112 and/or the advertiser workstation 106. For instance, the GUI 400 may generate a potential number of views for a particular campaign. The application server 112 and/or the advertiser workstation 106 may perform predictive analytics, based on statistical sampling of demographics in a particular geographic region at a given time of the day or night, to predict a potential number of viewers of an advertisement campaign. Furthermore, the advertising fee may be based on such analytics. To provide the advertiser with an advertising campaign that meets its budget, optionally, an AI system may generate one or more recommendations based on the predictive analytics to meet the budget of the advertiser. Additionally, the GUI 400 may display various visual indications (e.g., graphs) such as data pertaining to the performance of an advertising campaign (e.g., advertising balance, predicted number of views, advertisement dates, advertisement locations, and advertisement times). Furthermore, the GUI 400 may display data (e.g., amount earned, amount of time spent in a particular geographic location, automobile speed, etc.) pertaining to the particular driver 102 that drove on the trip. For example, an advertiser may prefer a driver that drives more slowly than another so that the display device 109 is more viewable on the automobile 300. In one embodiment, the GUI 400 allows the advertiser to track and view the real-time, or substantially real-time, movement of the automobile 300. The GUI 400 may display a virtual image of the automobile 300, and the movement associated therewith, on a virtual map.

Although the content is illustrated as images, other advertisement content (e.g., audio, text, etc.) may also be included within the advertisements. Furthermore, the GUI 400 may allow the advertiser to select different sizes for image displays of the advertising campaign on the display device 109. In one embodiment, the GUI 400 may allow for advertisement sharing of space rendered by the display device 109 with different advertisements from the same advertiser, or different advertisements from different advertisers.

Figure 5A:
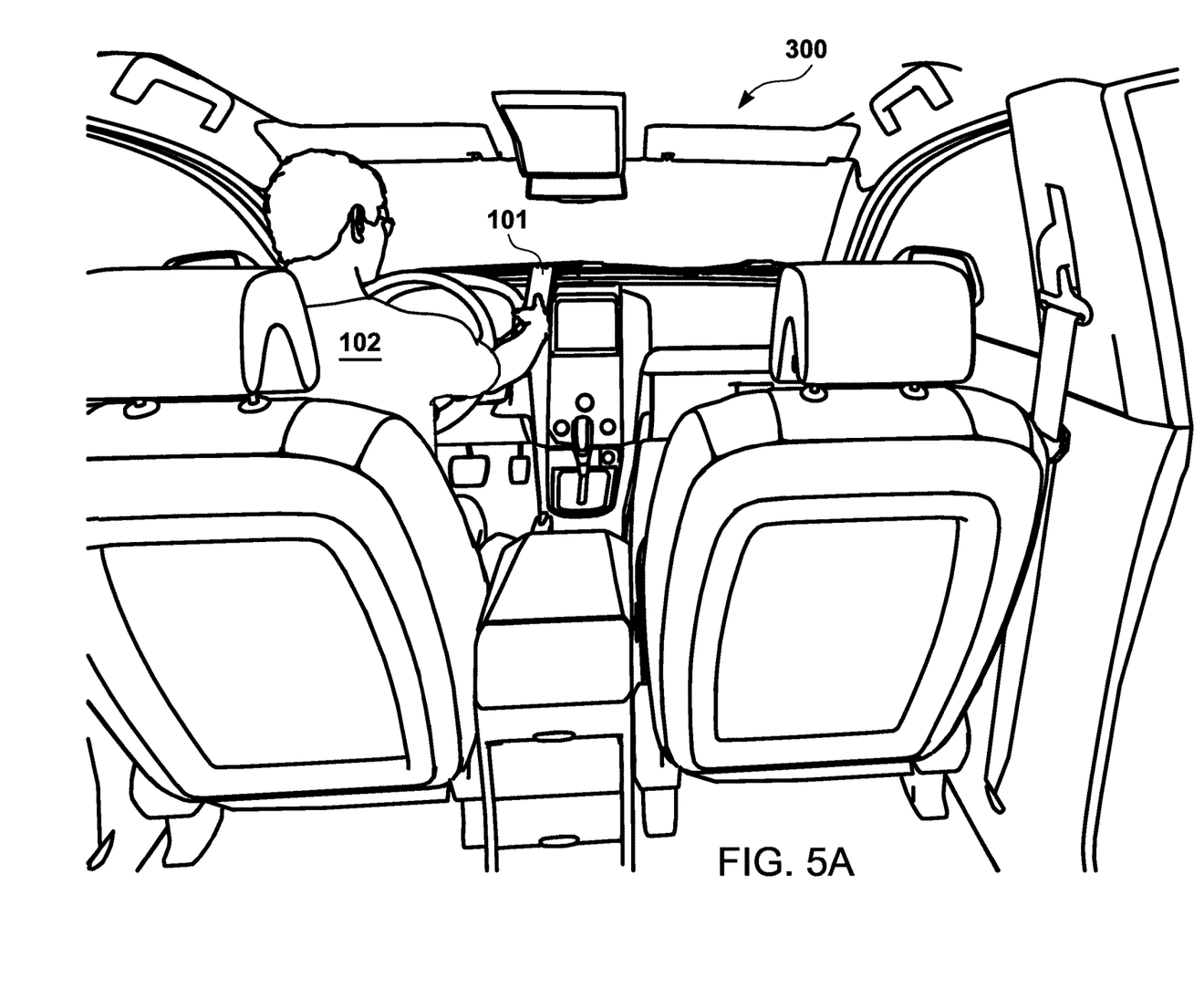
FIG. 5A illustrates the driver interacting with the mobile computing device within the automobile.
Figure 5B:
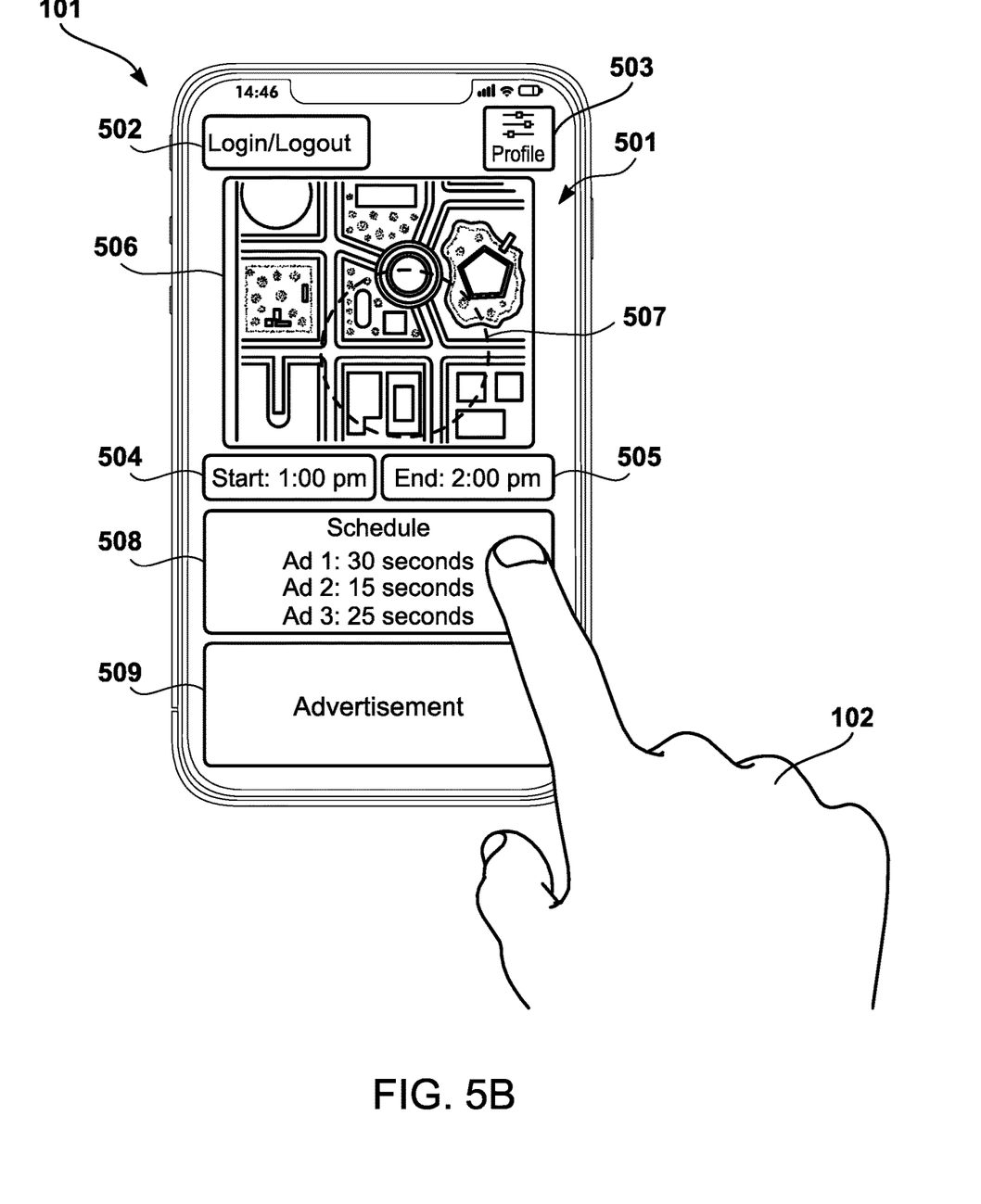
FIG. 5B illustrates a GUI that may be displayed by the mobile computing device.

Additionally, FIGS. 5A and 5B illustrate the mobile computing device 101, as utilized by the driver 102 within the automobile 300 before, during, or after the advertising trip in which the advertisement is displayed by the display device 109. In particular, FIG. 5A illustrates the driver 102 interacting with the mobile computing device 101 within the automobile 300.

FIG. 5B illustrates a GUI 501 that may be displayed by the mobile computing device 101. For instance, the GUI 501 may have a login/logout indicium 502 that the driver 102 may activate to provide credentials to login to the software application, or to logout. Furthermore, the GUI 501 may have a profile indicium 503 that the driver 102 may activate to view and/or edit a profile of the driver 102. Additionally, the GUI 501 may have a start indicium 504 and an end indicium 505, which the driver 102 may activate to initiate and complete the trip, respectively. Moreover, the GUI 501 may display a virtual map 506 that displays a start point, end point, and path for the trip. The virtual map may also display a geographic region 507 (e.g., radius) in which the dynamic advertisement schedule is activated for the display of advertisements on the display device 109. In one embodiment, various indications (e.g., markers, shadings, colors, etc.) may indicate different portions of the geographic region in which corresponding advertisements are to be displayed from the dynamic advertisement schedule. In particular, the GUI 501 may also display a dynamic advertisement schedule indicium 508 that indicates the sequence of the advertisements to be displayed, as well as the number of advertisements. For instance, each advertisement may have a marker (e.g., numeral, symbol, etc.) that corresponds to a marker displayed in the virtual map 506. As an alternative, the dynamic advertisement schedule indicium 508 may only display a set of advertisements to be displayed for a current geographical portion of the trip (e.g., the first mile of a five mile trip). The dynamic advertisement schedule indicium 508 may then rotate through subsequent schedule sets of advertisements, and the virtual map 506 may be updated accordingly with corresponding markers. Finally, in one embodiment, a current advertisement image 509 may be displayed by the GUI 501. Given that the driver 102 is unlikely to be able to view the advertisement that is being displayed by the display device 109, the GUI 501 allows the driver 102 to have a real-time view of the current advertisement image 509.

Figure 6:
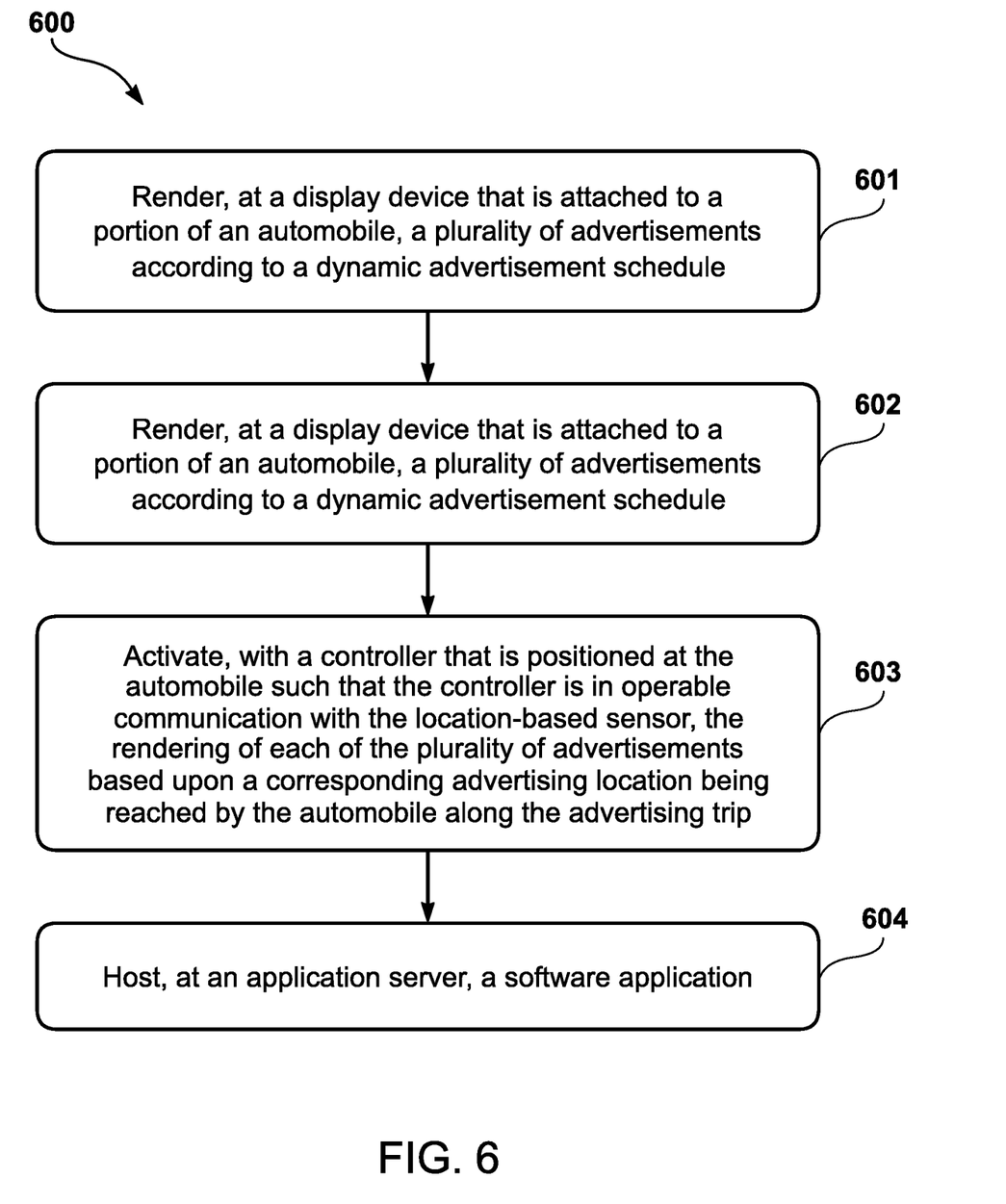
FIG. 6 illustrates a process that may be utilized to perform location-based advertising.

FIG. 6 illustrates a process 600 that may be utilized to perform location-based advertising. At a process block 601, the process 600 renders, at the display device 109 that is attached to a portion of the automobile 300, a plurality of advertisements according to a dynamic advertisement schedule. The display device 109 may have a flexible display screen that adjusts to a shape of the portion of the automobile 300. Furthermore, at a process block 602, the process 600 determines, at a location-based sensor 111 that is positioned at the automobile 300, a geographical position of the automobile 300 along an advertising trip performed by the automobile 300. At a process block 603, the process 600 activates, with a controller 108 that is positioned at the automobile 300 such that the controller is in operable communication with the location-based sensor 111, the rendering of each of the plurality of advertisements based upon a corresponding advertising location being reached by the automobile 300 along the advertising trip. Finally, at a process block 604, the process 600 hosts, at the application server 112 a software application, which is executed by the driver 102 operating the automobile 300 to render, at a computing device positioned within the automobile, a GUI corresponding to the dynamic advertisement schedule.

The computing device illustrated in the accompanying drawings is depicted as a mobile computing device that may be attached to the interior portion of the automobile 300, such as via a mobile device accessory; alternatively, the computing device may be integrated within the automobile 300, such as via an onboard computing system having a display in the dashboard or console of the automobile. As yet another alternative, the mobile computing device may communicate with the application server 112 and/or the automobile advertising control system 103, but may then transmit data to the integrated computing device for display on the dashboard and/or console of the automobile 300.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A system comprising:
    a display device that is attached to a portion of an automobile, the display device rendering images on a display screen of the display device visible outside of the automobile, the display device further comprising an automobile control system comprising a location-based sensor, for determining a geographical position of the automobile, a display controller and display controller memory storing display controller instructions that when executed by the display controller perform steps including receiving location data from the location-based sensor and transmitting the location data to an application server;
    a user computing device, positioned within the automobile;
    one or more workstations each having a workstation processor and workstation memory storing workstation instructions that perform steps including transmitting, to the application server, location-based rules specifying image content to be displayed in specified geographic areas at specific times, and further specifying a predetermined threshold of a number of automobiles that display a given threshold-limited image in a given geographic region; and
    the application server comprising a server processor and server memory storing server instructions that when executed by the server processor perform steps of:
    1) receiving the location-based rules from the one or more workstations,
    2) determining from the location-based rules a dynamic content schedule specifying a sequence of image content to display at the display device when the automobile is in the given geographic region at a given display time,
    3) receiving from the display controller a location of the automobile and a time stamp, wherein the location and the time stamp correspond to the given geographic region and the given display time of the dynamic content schedule,
    4) responsively determining that the predetermined threshold of the number of automobiles displaying the threshold-limited image in the given geographic region has been reached,
    5) responsively generating an update to the dynamic content schedule including a different image in place of the threshold-limited image,
    6) transmitting the updated dynamic content schedule to the display controller and to the computing device,
    wherein the display controller instructions further include transmitting a current image corresponding to the updated dynamic content schedule to the display screen, responsively to receiving the updated dynamic content schedule, and wherein the graphic unit interface (GUI) of the computing device concurrently displays the current image,
    wherein the display screen is a transparent light emitting diode (LED) display screen installed on a window of the automobile to be viewed from the exterior of the automobile, allowing at least partial transparency for the driver to see through the display screen.

2. The system of claim 1, wherein the computing device is a mobile computing device, and wherein the instructions of the application server further include receiving from the computing device a location of the computing device and confirming that the computing device and the display device are co-located.

3. The system of claim 1, wherein the computing device is integrated into the automobile.

4. The system of claim 1, wherein the instructions of the application server further include generating the sequence of image content of the dynamic content schedule and sending the dynamic content schedule to the computing device in real-time to be rendered at the display device with the corresponding given geographic region being reached by the automobile.

5. The system of claim 1, wherein the application server generates the dynamic content schedule based upon criteria including campaign start dates and end dates provided by the one or more workstations.

6. The system of claim 1, wherein the application server generates the dynamic content schedule by determining, according to one or more statistical samples of viewers along a planned advertising trip of the automobile, a probability of each image of the sequence of image content reaching one or more intended audiences.

7. The system of claim 1, wherein the device GUI that displays the dynamic content schedule at the computing device also displays a map indicating the given geographic region.

8. The system of claim 1, wherein the portion of the automobile to which the display device is attached is selected from a group consisting of: an interior part of a rear window of the automobile, an exterior part of a hood of the automobile, and an exterior part of a door of the automobile.

* * * * *